United States Patent Office 3,006,768 Patented Oct. 31, 1961

3,006,768

PROCESS FOR THE TENDERIZING OF MEAT USING WATER

Beverly E. Williams, La Grange Park, Ill., assignor to Hodges Research and Development Company, New York, N.Y., a corporation of California No Drawing. Filed Sept. 1, 1959, Ser. No. 837,330
1 Claim. (Cl. 99—107)

This invention relates to processes for tenderizing meat using water and more particularly to such processes wherein the freshly slaughtered carcass before rigor mortis is stitched pumped with controlled amounts of water at controlled pressures and temperatures to obtain an unexpected improvement in the tenderness of the meat.

Heretofore meat has been tenderized by hanging in a cooler for extended periods of time to permit the natural enzymes and molds in the meat not only to tender the meat but to improve its flavor.

It has also been heretofore proposed to stitch pump freshly slaughtered carcasses with enzyme solutions and to thereafter control the temperatures of the injected carcasses to improve the tenderness and flavor of the meat.

Most unexpectedly, I have found that if the freshly slaughtered carcass before rigor mortis is injected with from 1 to 3% and preferably about 2% by weight of water at pressures of about 40 to 100 pounds per square inch and with the water at or about or slightly above animal body temperatures at, say, 100° F. the tenderness of the meat will be improved at least by 20%. The amounts of water employed and the pressures used are critical and very little improvement in tenderness was found when 1% by weight of water was employed at pressures of less than 35 pounds per square inch.

It is accordingly the object of the present invention to provide novel processes for the tenderization of meat by injecting freshly slaughtered carcasses before rigor mortis with from 1 to 3% and preferably approximately 2% by weight of water at pressures of from 40 to 100 pounds per square inch with the water at temperatures approximating the body temperature of the carcasses or above.

The number of needles employed in injecting the carcass with water under pressure, as above, will depend upon the size of the carcass and the type of meat. For example, six to twelve needles could be employed in the injection of a side of beef and these needles may be supplied with the water under pressure from any suitable source. Two or three of the needles may be inserted into the round, one into the loin-end and short loin, one into the rib, one into the brisket and one into each shank muscle. The remaining needles may be inserted into the chuck, one downwardly toward the neck and the other horizontally toward the shoulder, or a large number of smaller needles may be spring-mounted and used to interstitially pump the fluid into the muscle.

In the case of lamb or veal which are round dressed and not split into sides on the killing floor, one needle is positioned in each leg of the lamb, two needles in each round of veal, one needle into each short loin and loin-end section, one needle into each rib and another needle into the chuck or shoulder of lamb for a total of eight needles for each lamb and ten needles for each veal.

I have found that for best results the needles may be approximately seven inches long, one-quarter inch in diameter and have approximately twelve holes with the first hole approximately one inch from the end of the needle.

In one process in accordance with the present invention a side of beef weighing approximately 300 pounds was injected, as above, before rigor mortis with 2% by weight of water at about animal temperature and at 100 pounds per square inch pressure. The pressure dropped about 20% before pumping was completed and the pumping time was a matter of a few seconds. Steaks from this side of beef were sampled two days, five days, and seven days after pumping and the meat was greatly improved in tenderness over that from the control side, both cooked to an internal temperature of 155° F.

Improved tenderness was also obtained when a similar side of beef was pumped with 2% by weight of water at normal animal temperatures or slightly above at 50 pounds per square inch pressure. In this case the pressure dropped to about 40 pounds per square inch during pumping. Again the pumping time was a matter of a few seconds. Comparative testing of steaks from the pumped side and from the control side showed noticeably improved tenderness of the pumped side within a matter of a few days.

It is believed that the improved tenderness obtained by the processes discussed above is due to both physical and chemical reasons. Physically, injection of water under the relatively high pressures here employed penetrates, separates and ruptures the muscle bundle fibers to increase their tenderness. The presence of water within the musicle bundle fibers during cooking provides added moisture which expands under temperature to further separate, soften and rupture the musicle bundle fibers making for increased tenderness of the cooked meat.

The water injected under pressure, as above, activates chemically the natural enzymes in the meat which enzymes are hydrolytic and act faster and with greater effect due to increased moisture. Further the use of water at body temperatures, or slightly above at, say 100° F. (but below 120° F. or searing temperatures), slows down the rate of chill of the meat and additionally, due to that, stimulates rigor mortis thus additionally contributing to tenderness because the quicker rigor mortis sets in the quicker tenderization is accomplished.

The results discussed above have been obtained by the use of plain water sterile or potable injected in the critical amounts and pressures defined. Additives may be used with water including gelatin which is hydroscopic and helps distribute the added moisture in the meat. Phosphates may also be added to the water to help retain moisture within the meat tissues. Salt of isotonic or hypotonic proportions may also be incorporated in the water but it is to be again emphasized that these additives are not critical to obtaining the enhanced tenderness of the processes of the present concept. If salt water of hypertonic strength is used, there is a tendency for the moisture within the muscle bundles to travel by osmosis from within to without the cell wall.

If there is no salt in the added water or if the level is below that of the meat (hypotonic) then there is a tendency for the natural salt of the moisture within the cells to draw the water through the cell walls and thus trap and hold it.

Comparing a half beef carcass injected as above with the control side it has been found that the injected side has a slightly improved color, that is, a slight brightening of the red meat due to leaching out of some of the red myoglobin. This improved color is very beneficial in improving the appearance of the meat.

Any apparatus which will provide the necessary pressure and control the amount of water injected into the carcass may be employed in carrying out these processes. Individual pumps with individual needles may be employed; a single pump supplying a manifold to which the six or more needles are connected may be employed; or the needles may be mounted in a common holder for simultaneous insertion into the carcass with each needle connected to a suitable source of supply of water under pressure.

It should now be apparent to one skilled in the art that the objective of the invention, as described above, has been fully met by the above described processes; that changes in or modification to these illustrative procedures may be employed without departing from the present inventive concept; and that various apparatus may be employed to carry out these processes as long as the critical volumes of water and critical temperatures and pressures are employed. Reference should therefore be had to the appended claim to determine the scope of this invention.

What is claimed is:

In a method for increasing the tenderness and juiciness of cooked beef, lamb and veal the step of adding water in the muscle portion of the meat by multiple entry injection of 1–3% water by weight under pressure of from 40 to 100 pounds per square inch and at a temperature of approximately 100° F. directly into the muscle of freshly slaughtered animals whereby the muscle bundle fibers are uniformly penetrated, separated and saturated by the water thereby promoting hydrolytic activity of the natural enzyme during normal aging of the meat and increasing the tenderness of the meat in the cooking process.

References Cited in the file of this patent

UNITED STATES PATENTS

| | | |
|---|---|---|
| 2,687,961 | Ellis | Aug. 31, 1954 |
| 2,767,096 | Schotte | Oct. 16, 1956 |
| 2,805,163 | Williams | Sept. 3, 1957 |
| 2,852,391 | Williams | Sept. 16, 1958 |
| 2,870,018 | Williams | Jan. 20, 1959 |